United States Patent
Arduino et al.

(10) Patent No.: US 6,310,316 B1
(45) Date of Patent: Oct. 30, 2001

(54) EQUIPMENT FOR THE LASER-CUTTING OF METAL SHEETS

(75) Inventors: Alberto Arduino, Turin; Alberto Staurenghi, Torinese, both of (IT)

(73) Assignee: Amada Company Limited, Isehara ( * ) Notice: Subject to any disclaimer, the term of this patent is extended or adjusted under 35 U.S.C. 154(b) by 0 days.

(21) Appl. No.: 09/380,765
(22) PCT Filed: Mar. 11, 1998
(86) PCT No.: PCT/JP98/01022
§ 371 Date: Jan. 4, 2000
§ 102(e) Date: Jan. 14, 2000
(87) PCT Pub. No.: WO98/40185
PCT Pub. Date: Sep. 17, 1998

(30) Foreign Application Priority Data

Mar. 12, 1997 (IT) ................................. TO97A0202

(51) Int. Cl.[7] ................................. B23K 26/38
(52) U.S. Cl. .................. 219/121.67; 219/121.84
(58) Field of Search ............. 219/121.67, 121.72, 219/121.84

(56) References Cited

U.S. PATENT DOCUMENTS

| | | | |
|---|---|---|---|
| 4,031,351 | * 6/1977 | Martin | 219/121.84 |
| 4,406,940 | 9/1983 | Tsutsumi | 219/121.84 |
| 4,711,985 | * 12/1987 | Wilkerson | 219/121 |
| 5,227,606 | * 7/1993 | Weeks et al. | 219/121.84 |

FOREIGN PATENT DOCUMENTS

| | | | |
|---|---|---|---|
| 0 454 620 A1 | 10/1991 | (EP) . | |
| 0 557 942 A1 | 9/1993 | (EP) . | |
| TO 95A000569 | 6/1995 | (IT) . | |
| 62-6790 | * 1/1987 | (JP) | 219/121.84 |
| 2-89588 | * 3/1990 | (JP) | 219/121.84 |

OTHER PUBLICATIONS

English Abstract of Japan Patent Document 62–168,689.

* cited by examiner

Primary Examiner—Geoffrey S. Evans
(74) Attorney, Agent, or Firm—Blank Rome Comisky & McCauley, LLP

(57) ABSTRACT

Equipment for the laser cutting of metal sheets is to hold the metal sheets in a vertical plans by means of a laser-focusing head (10) which is movable in a vertical plans relative to the metal sheet (12). The equipment includes an abutment member (18) carried by the focusing head (10) and intended to bear against that face (20) of the sheet (12) facing the focusing head (10).

12 Claims, 2 Drawing Sheets

EQUIPMENT FOR THE LASER-CUTTING OF METAL SHEETS

TECHNICAL FIELD

The present invention relates to equipment for the laser-cutting of metal sheets, comprising;
means for supporting a metal sheet to be cut in a substantially vertical plane, and
a laser-focusing head movable relative to the metal sheet in a vertical plans.

BACKGROUND ART

Integrated equipment for the laser-cutting and bending of pieces of sheet metal is known from Italian Patent Application No. TO95A00569, by the same Applicants, in which the sheets to be cut are held in a vertical plane.

Several problems arise in the laser-cutting of metal sheets held in a vertical position which do not generally occur in more conventional cases in which the metal sheet to be cut rests on a horizontal surface. A first problem arises when cutting is effected along a closed path so as to produce a through-hole, of any profile, in the metal sheet. In this case a waste piece is produced having a shape corresponding to that of the aperture to be formed. At the end of the cutting process, the waste piece could fall towards the laser-focusing head. There is thus a danger of the laser-focusing head being hit by the waste piece, causing jamming or damage to the focusing head. A second problem results from the fact that the metal sheet is generally suspended from its upper horizontal edge and, during working, may oscillate or vibrate so that the distance between the leaser-focusing head and the surface of the sheet metal being cat varies. The focusing head usually has a capacitive distance sensor which adjusts the distance of the head from the surface to be cut. In fact it is important for this distance to be kept constantly at a predetermined value to ensure correct focusing of the laser beam. However, when the sheet metal vibrates or oscillates rapidly, the head cannot follow the movement of the surface because of the inertia of the distance sensor and the kinematic(cinematic) chain which controls the movement of the focusing head in a direction perpendicular to the metal sheet.

DISCLOSURE OF INVENTION

The present invention has been achieved with such a point in mind. Therefore, the object of the present invention is to provide equipment for the laser-cutting of sheets in a vertical plane which overcomes the said problems.

According to the present invention, this object is achieved by virtue of the fact that the equipment includes an abutment member carried by the focusing head and intended to bear against that face of the sheet to be cut which faces the focusing head.

The abutment member prevents the waste pieces from falling towards the focusing head and knocking or jamming of the focusing head against the pieces. Moreover the abutment member makes the system for supporting the sheet metal more rigid and considerably reduces the possibility of the sheet vibrating or oscillating, particularly in the cutting zone.

BRIEF DESCRIPTION OF DRAWINGS

Further characteristics and advantages of the present invention will become apparent during the detailed description which follows, given purely by way of non-limitative example, with reference to the appended drawings, in which.

BEST MODE FOR CARRYING OUT THE INVENTION

Figure 2:
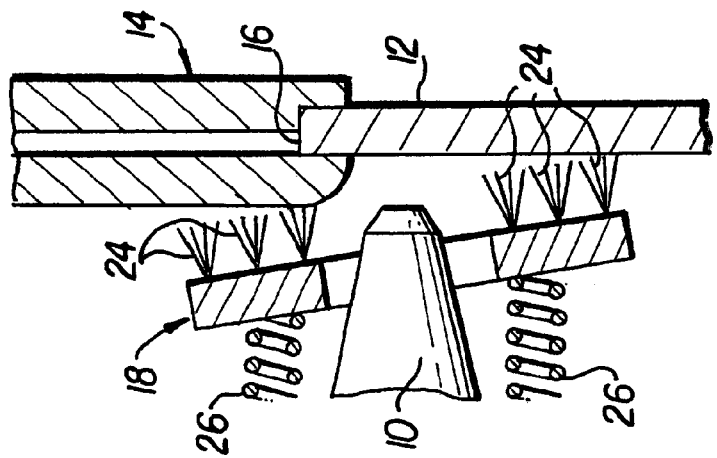
FIG. 2 illustrates the equipment of FIG. 1 schematically during the formation of a cut in correspondence with a member which grips the metal sheet.

There will be detailed below the preferred embodiments of the present invention with reference to the accompanying drawings. Like members are designated by like reference characters.

Figure 1:
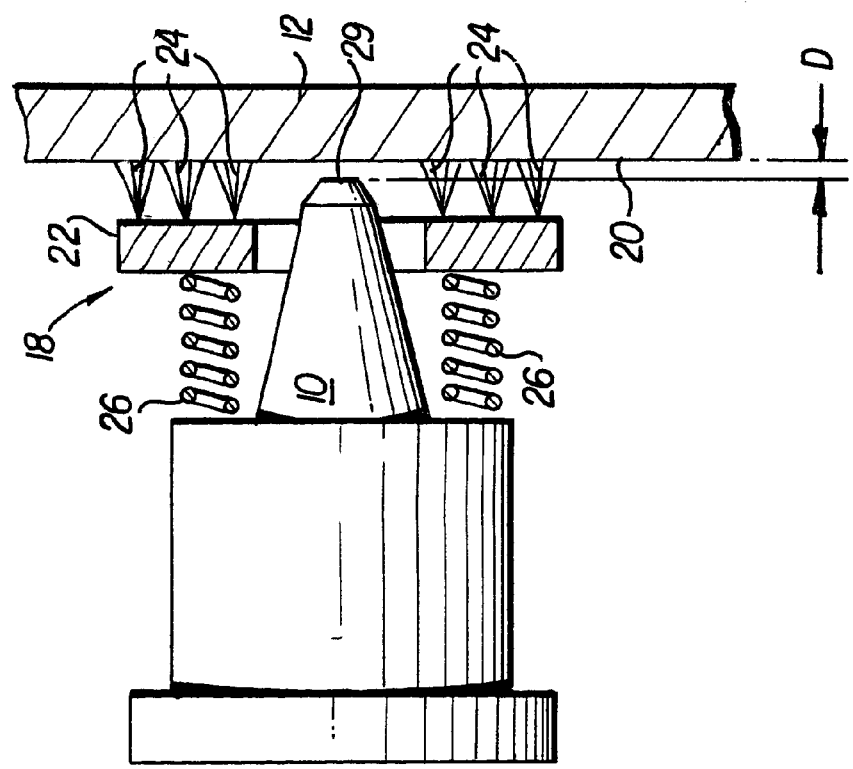
FIG. 1 is a schematic view of a first embodiment of equipment according to the present invention.

With reference initially to FIGS. 1 and 2, a laser-focusing head is generally indicated 10 and forms part of automatic laser-cutting equipment, for example of the type described in detail in Italian Patent Application No. TO95A000569. The laser-focusing head 10 is carried by a drive structure of known type constituted, for example, by a cartesian [X, Y] robot which enables the head 10 to be moved in a vertical working plane.

A metal sheet intended to be cut by means of the head 10 is indicated 12. The sheet 12 is held suspended in a vertical plane parallel to the plane of movement of the head 10 by means of gripper members constituted, for example, by jaws such as those indicated 14 in FIG. 2. The jaws 14 grasp the metal sheet 12 by a portion adjacent its horizontal upper edge 16.

According to the present invention, the laser-focusing head 10 carries an abutment member 18 which, in use, is intended to bear against that face 20 of the metal sheet 12 facing the focusing head 10. In the embodiment illustrated in FIGS. 1 and 2, the abutment member 18 is generally in the form of a brush and comprises a disc-like annular member 22 carrying a plurality of filiform elements 24 grouped in tufts and defining an abutment surface intended to contact the face 20 of the sheet 12. The filiform elements 24 forming the bristles of the brush may, for example, be of bronze, plastics or other material.

In a preferred embodiment of the present invention, the abutment member 18 is connected to the laser-focusing head 10 so that it can oscillate about a generic axis parallel to the face 20. This connection is preferably formed by resilient members 26, each of which has a first end fixed to the body 22 and a second end fixed to the focusing head 10. The ability of the abutment member 18 to float relative to the focusing head 10 is useful particularly when it is necessary to form cuts close to the jaws 14 which hold the metal sheet 12. As illustrated in FIG. 2, the abutment member 18 may surmount the jaw 14, disposing itself in an inclined position. Thus the head 10 may operate even in the immediate vicinity of the jaws 14.

In rest conditions, the distance between the front face 29 of the focusing head 10 and the abutment face of the abutment member 18 is equal to, or slightly greater than, the distance (indicated D in FIG. 1) that it is necessary to maintain between the front face 29 and the face 20 of the piece 12 for correct focusing of the laser beam. Hence, in use, the abutment face of the abutment member 18 is lightly loaded into sliding contact with the face 20. The member 18 thus provides a stable abutment for the sheet 12 and considerably reduces the possibility of it vibrating or oscillating. The reduction in the oscillating or vibrating movement of the sheet 12 is particularly marked in the abutment zone surrounding the cutting zone.

Moreover the abutment member 18 prevents waste pieces and swarf formed when holes or apertures are cut from falling towards the focusing head 10. In fact, the presence of an abutment surface facing the surface 20 of the metal sheet 12 ensures that the swarf and waste pieces always fall away from the focusing head 10, avoiding any risk of damage to, or jamming of, the head 10.

Figure 4:
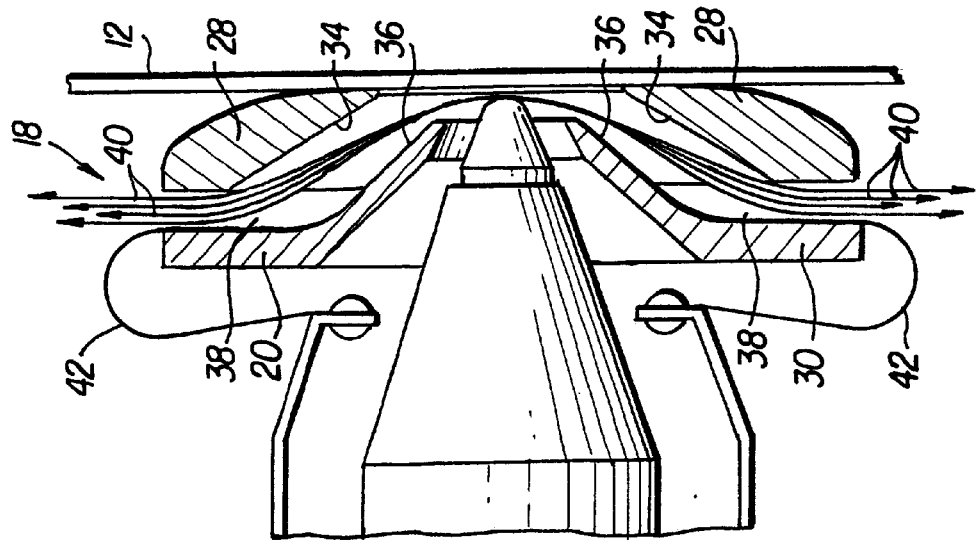
FIG. 4 illustrates schematically the equipment of FIG. 3 in an initial phase of cutting.
Figure 3:
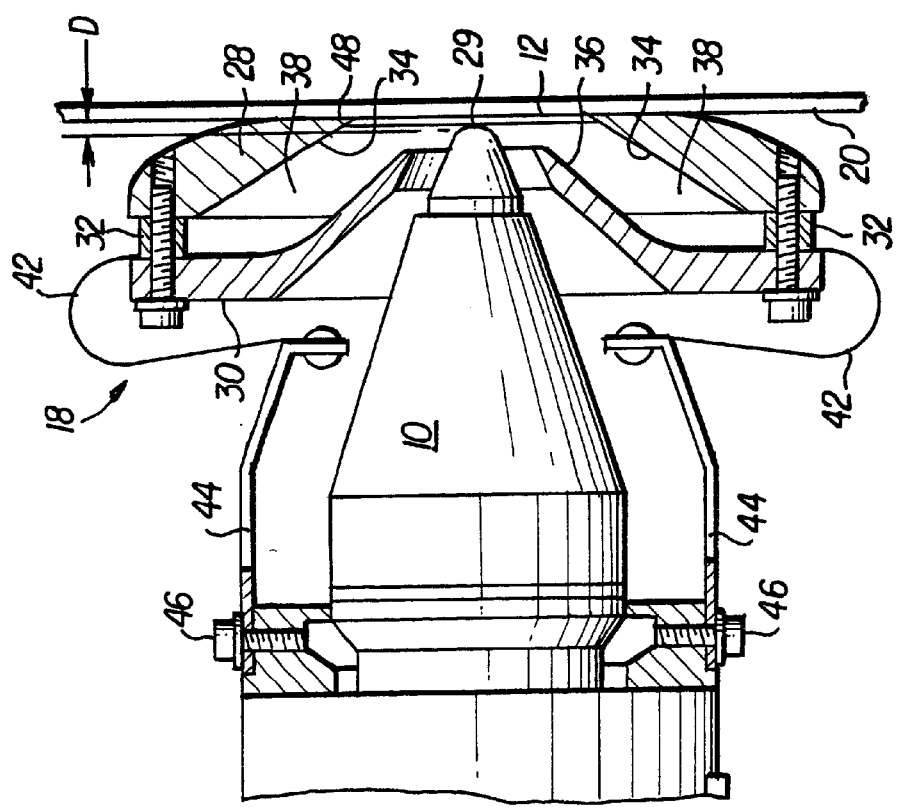
FIG. 3 is an axial section illustrating a second embodiment of an abutment member according to the present invention.

FIGS. 3 and 4 illustrate an improved embodiment of the abutment member of the present invention. The brush-like abutment member described above has the disadvantage that, during the initial piercing the metal sheet 12, the gas let supplied by the laser-focusing head 10 is projected rearwardly, entraining with it the molten material which tends to collect on the filiform elements 24 and in the space formed between the nozzle of the laser head 10 and the bristles 24.

The object of the version of the abutment member illustrated in FIGS. 3 and 4 is to overcome this problem.

With reference to FIGS. 3 and 4, the abutment member 18 comprises two shaped discs 25 and 30, preferably made from self-lubricating plastics material (typically TEFLON Registered Trade Mark). The two discs 28, 30 are kept separated from each other by spacer elements 32 so that they define an annular channel 38 between the facing surfaces 34, 36 of the two discs 28, 30. As illustrated in FIG. 4, the shape of the channel 38 means that the flow of gas and molten material which forms during the initial phase of the piercing of the metal sheet 12 is deflected along the channel 38 in a radially-outward movement as shown schematically by the arrows 40. The walls 34, 36 of the channel 38 are smooth and facilitate the outward sliding flow of the dust and molten material entrained by the gas flow. Moreover, it has been found experimentally that the molten material transported by the gas flow has very little affinity for the self-lubricating plastics material constituting the two discs 28, 30 and slides over the walls 34, 36 without forming deposits and without damaging the discs 28, 30. In the version illustrated in FIGS. 3 and 4, the abutment member 18 is again connected to the laser-focusing head 10 in a floating manner. This connection is achieved by means of a series of leaf springs 42 spaced circumferentially around the outer edge of the abutment member 18. Respective first ends of the leaf springs 42 are fixed to the spacers 32 which connect the discs 28, 30 together. Respective second ends of the leaf springs 42 are connected to support elements 44 fixed to the laser-focusing head 10, for example by screws 46. Like the embodiment described above, the disc 28 presents a flat abutment surface 48 which, in rest conditions, is spaced from the front surface 29 of the laser-focusing head by a distance equal to, or slightly greater than, the distance D between the front surface 29 of the laser head 10 and the face 20 of the sheet 12 in operative conditions.

This invention is not limited for the embodiments described above. For example, the jaws is arranged for supporting a metal sheet 12 to be cut in a horizontal lane instead of the vertical plane, and the laser focusing head 10 can be designed to move relative to the metal sheet 12 in a horizontal plane instead of the vertical plane.

While preferred embodiments of the present invention have been described using specific terms, such description is for illustrative purposes, and it is to be understood that changes and variations may be made without departing from the spirit or scope of the following claims.

INDUSTRIAL APPLICABILITY

As stated hereinbefore, the equipment for the laser cutting of metal sheets according to the invention is applicable for use in laser cutting machines, especially for a laser cutting machine which comprises jaw member for supporting a metal sheet to be cut in a horizontal or vertical plane and a laser focusing head movable relative to the metal sheet in a horizontal or vertical plane.

What is claimed is:

1. Equipment for the laser cutting of metal sheets, comprising:

means for supporting a metal sheet to be cut in a plane, a laser focusing head movable relative to the metal sheet in a plane; and an abutment member carried by the focusing head and intended to bear against that face of the sheet facing the focusing head;

wherein the abutment member comprises two shaped discs spaced from each other and having respective mutually facing surfaces which define a channel for the evacuation of a return gas flow.

2. Equipment according to claim 1, wherein at least one of the shaped discs is made from self-lubricating plastics material.

3. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member comprises an annular body having a plurality of filiform elements arranged in a brush configuration.

4. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member comprises two shaped discs spaced from each other and having respective mutually facing surfaces which define a channel for the evacuation of a return gas flow.

5. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head; and wherein the abutment member is generally annular and surrounds an end portion of the focusing head; and wherein the abutment member comprises two shaped discs spaced from each other and having respective mutually facing surfaces which define a channel for the evacuation of a return gas flow.

6. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member presents a front abutment surface which, in rest conditions, is spaced from a facing surface of the focusing head by a distance equal to, or slightly greater than, the distance which, in operative conditions, lies between the front face of the focusing head and the face of the sheet to be cut; and wherein the abutment member comprises two shaped discs spaced from each other and having respective mutually facing surfaces which define a channel for the evacuation of a return gas flow.

7. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member is connected to the focusing head so as to be able to pivot about a generic axis parallel to the plane of movement of the head; and wherein the abutment member comprises two shaped discs spaced from each other and having respective mutually facing surfaces which define a channel for the evacuation of a return gas flow.

8. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member is connected to the focusing head so as to be able to pivot about a generic axis parallel to the plane of movement of the head;

wherein the connection between the abutment member and the focusing head is formed by resilient means; and wherein the abutment member comprises two shaped discs spaced from each other and having respective mutually facing surfaces which define a channel for the evacuation of a return gas flow.

9. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member is generally annular and surrounds an end portion of the focusing head; and wherein the abutment member comprises an annular body having a plurality of filiform elements arranged in a brush configuration.

10. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member presents a front abutment surface which, in rest conditions, is spaced from a facing surface of the focusing head by a distance equal to, or slightly greater than, the distance which, in operative conditions, lies between the front face of the focusing head and the face of the sheet to be cut; and wherein the abutment member comprises an annular body having a plurality of filiform elements arranged in a brush configuration.

11. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member is connected to the focusing head so as to be able to pivot about a generic axis parallel to the plane of movement of the head; and wherein the abutment member comprises an annular body having a plurality of filiform elements arranged in a brush configuration.

12. Equipment for the laser cutting of metal sheets, comprising:

means for supporting a metal sheet to be cut in a substantially vertical plane;

a laser focusing head movable relative to the metal sheet in a vertical plane; and an abutment member carried by the focusing head and intended to bear against that face of the sheet facing the focusing head;

wherein the abutment member is connected to the focusing head so as to be able to pivot about a generic axis parallel to the plane of movement of the head;

wherein the connection between the abutment member and the focusing head is formed by resilient means; and wherein the abutment member comprises an annular body having a plurality of filiform elements arranged in a brush configuration.

* * * * *